United States Patent

D'Luna et al.

[11] Patent Number: 5,311,459
[45] Date of Patent: May 10, 1994

[54] SELECTIVELY CONFIGURABLE INTEGRATED CIRCUIT DEVICE FOR PERFORMING MULTIPLE DIGITAL SIGNAL PROCESSING FUNCTIONS

[75] Inventors: Lionel J. D'Luna, Rochester; James R. Milch; Timothy J. Kenney, both of Pittsford, all of N.Y.

[73] Assignee: Eastman Kodak Company, Rochester, N.Y.

[21] Appl. No.: 946,124

[22] Filed: Sep. 17, 1992

[51] Int. Cl.⁵ .............................................. G06F 7/52
[52] U.S. Cl. ................................ 364/754; 364/724.16; 364/725.01
[58] Field of Search ............... 364/754, 736, 728.01, 364/724.12, 726.16

[56] References Cited

U.S. PATENT DOCUMENTS

| | | | |
|---|---|---|---|
| 3,748,451 | 7/1973 | Ingwersen | 364/728.01 |
| 4,493,048 | 1/1985 | Kung et al. | 364/754 |
| 4,891,689 | 1/1990 | Senda et al. | |
| 4,937,774 | 6/1990 | Malinowski | 364/728.01 X |
| 5,001,663 | 3/1991 | Parulski et al. | |
| 5,151,953 | 9/1992 | Landeta | 364/728.01 X |
| 5,195,050 | 3/1993 | Hsu et al. | 364/754 X |

Primary Examiner—Tan V. Mai
Attorney, Agent, or Firm—David M. Woods

[57] ABSTRACT

A single integrated circuit device is disclosed that is capable of selectively functioning in real time as either a sequential matrix multiplier, a parallel matrix multiplier, a convolver or a finite input response FIR filter in order to process image data. A core group of multipliers is used to provide the basic multiplication operation that is common to each of the desired image processing functions. Input data router unit, coefficient router units and an output data router unit are responsive to mode selection control signals, supplied to a mode selection port, to route the appropriate input data and coefficients to the core group of multipliers and to route the output of the adders to the correct output port(s) for each of the desired processing functions.

17 Claims, 6 Drawing Sheets

SELECTIVELY CONFIGURABLE INTEGRATED CIRCUIT DEVICE FOR PERFORMING MULTIPLE DIGITAL SIGNAL PROCESSING FUNCTIONS

FIELD OF THE INVENTION

The invention relates in general to the field of digital signal processing. The invention relates specifically to a selectively configurable integrated circuit device that can be controlled to function as a sequential matrix multiplier, a parallel matrix multiplier, a convolver and a finite impulse response filter. The integrated circuit device is particularly useful in processing image data.

BACKGROUND

Color matrixing is a common image data processing operation that is used to either improve the color reproduction of images or to perform space transformations. A color space transformation matrix is used, for example, to convert red, green and blue image signals (RGB) into luminance (Y) and chrominance (R-Y, B-Y) image signals. A color correction matrix can also be used to correct the spectral sensitivities of image sensors for the chromaticities of the phosphor set of a particular display device or to correct film colorimetry for video display in film-to-video conversion operations.

Most matrixing devices are designed to perform a 3×3 matrixing operation on three parallel input components (RGB) in order to compute three parallel output components (YIQ). The three components of color image data, however, are sometimes provided sequentially rather than in parallel. Film scanning systems that employ trilinear electronic sensor devices, for example, often generate sequential red, green and blue output components. The sequential output components require a 1×4 matrix to be performed sequentially three times to achieve a sequential 3×4 matrix operation.

In addition to parallel and sequential matrixing operations, other data processing operations, including 2-D convolution operations and filtering with finite impulse response filters (FIR), are commonly employed on color image data to enhance the sharpness of images reproduced from the image data. In order to reduce costs, conserve space and improve processing efficiency, it is desirable to implement all four of the image data processing operations described above within a single integrated circuit device or chip having the capability of performing the data processing operations in real time. It is therefore an object of the invention to provide a single integrated circuit device that is capable of selectively functioning in real time as either a multiple sequential matrix multiplier, a parallel matrix multiplier, a 2-D convolver or a FIR filter in order to process image data, as well as to provide system related functions of loading and verifying look-up-tables (LUTs) used in a color space conversion system.

SUMMARY OF THE INVENTION

The invention provides a single integrated circuit device that is capable of selectively functioning in real time as either a multiple sequential matrix multiplier, a parallel matrix multiplier, a 2-D convolver or a 1-D FIR filter in order to process image data. In addition, the integrated circuit device is utilized in a color space conversion system to load and verify LUT's required for the operation of the system.

A core group of multipliers is provided in the single integrated circuit device to perform the basic multiplication operation that is common to each of the desired image processing functions. The core group of multipliers are coupled to an input data router unit and corresponding coefficient router units and adders. The adders are coupled to an output data router unit. The input data router unit, the coefficient router units and the output data router unit are responsive to mode selection control signals to route the appropriate input data and coefficients to the core group of multipliers and to route the output of the adders to the correct output port(s) for each of the desired processing functions.

The integrated circuit device also includes, in a preferred embodiment, an internal address generator that is coupled to the output ports of the device. The address generator supplies address data to LUTs coupled to the output ports to enable the LUTs to be loaded with data in a color conversion application of the integrated circuit device. For this application, the data to be loaded into the LUTs is supplied to a coefficient input port of the device, which is coupled—through an input data router—to data input ports of the integrated circuit device. The data inputs ports of the integrated circuit device are coupled to the data inputs of the LUTs.

BRIEF DESCRIPTION OF THE DRAWINGS

With the above as background, the invention will be described with reference to the following detailed description and the accompanying drawings, wherein.

BEST MODE OF CARRYING OUT THE INVENTION

The invention is based, in part, on the recognition that sequential and parallel matrix functions, convolution functions and FIR filter functions for use in image data processing have a common requirement for a basic multiply-accumulate operation. For example, a sequential 1×4 matrix function, a parallel 3×4 matrix function for color matrixing or space conversion, a two-dimensional 3×3 convolution function, and a one-dimensional FIR filter function with as many as nine taps are respectively defined by Eqs. 1-4 as follows:

$$[R_o] = [a_{11}\ a_{12}\ a_{13}\ a_{14}] \begin{bmatrix} R_i \\ G_i \\ B_i \\ 1 \end{bmatrix}, \quad (1)$$

$$[G_o] = [a_{21}\ a_{22}\ a_{23}\ a_{24}] \begin{bmatrix} R_i \\ G_i \\ B_i \\ 1 \end{bmatrix},$$

$$[B_o] = [a_{31}\ a_{32}\ a_{33}\ a_{34}] \begin{bmatrix} R_i \\ G_i \\ B_i \\ 1 \end{bmatrix}$$

$[R_o], [G_o], [B_o]$ Sequentially $$\begin{bmatrix} R_o \\ G_o \\ B_o \end{bmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} \begin{bmatrix} R_i \\ G_i \\ B_i \\ 1 \end{bmatrix} \quad (2)$$

$$X(m,n) = \sum_{i=-1}^{+1} \sum_{j=-1}^{+1} a(i,j)x(m-i, n-j) \quad (3)$$

$$X(n) = \sum_{i=0}^{M} a(i)x(n-i) \quad M = 8 \text{ maximum.} \quad (4)$$

It is clear from Eqs. (2) and (3) that nine multipliers are required to perform the specified functions. In addition, Eq. (1) requires that three multipliers be used three times sequentially with three sets of coefficients. Up to nine multipliers can be used in Eq. (4) depending on the number of filter taps utilized.

In view of the common requirement for multipliers to perform the desired functions, the invention utilizes a core group of multipliers that are selectively configured to perform each of the image processing functions. The utilization of a core group of multipliers significantly decreases the amount of circuit area (on an integrated circuit chip) and circuit elements required to perform the various functions, thereby permitting all of the required circuit elements necessary to perform the desired functions to be formed on a single integrated circuit chip using conventional large scale integration (LSI) technology.

Figure 1:
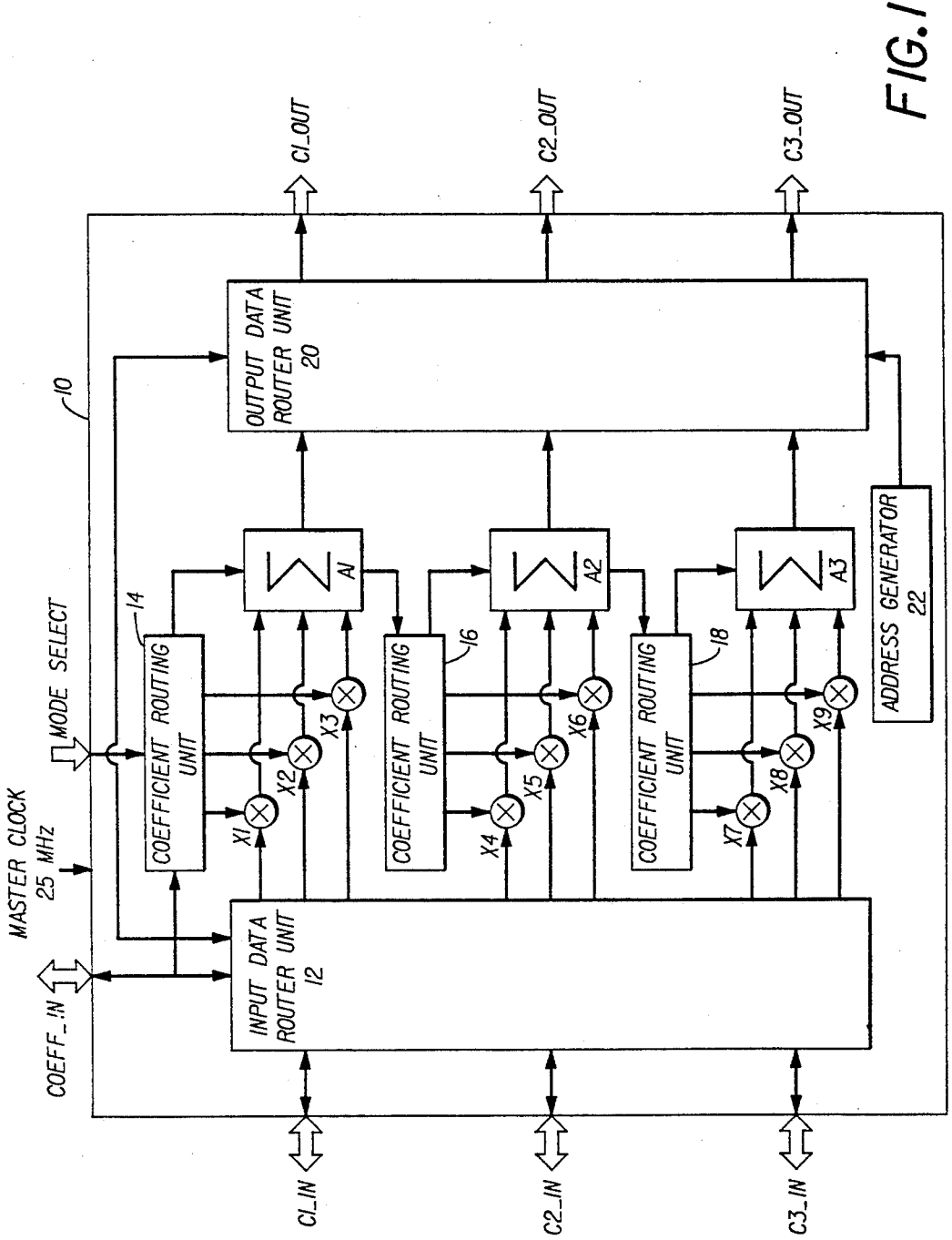
FIG. 1 is a basic block diagram of a selectively configurable integrated circuit device in accordance with the invention.

Referring now to FIG. 1, a block diagram of a preferred integrated circuit device 10 in accordance with the invention is shown including a core group of nine multipliers X1–X9 is arranged in three rows or channels of three multipliers (e.g. Row 1=X1-X3, Row 2=X4-X6, Row 3=X7=X9). The integrated circuit device architecture includes three data input ports C1_IN, C2_IN, C3_IN, three data output ports C1_OUT, C2_OUT, C3_OUT, a mode selection port MODE_SELECT and a coefficient input port COEFF_IN. The number of data input ports and data output ports required is dictated by the type of operations to be performed. For example, as will be described in greater detail below, the sequential matrix operation defined by Eq. (1) requires a single data input port and a single data output port, the parallel matrix operation defined by Eq. (2) requires three data input ports and three data output ports, the 2-D convolution operation defined by Eq. (3) requires three data input ports and a single data output port, and the FIR filter operation defined by Eq. (4) requires a single data input port and a single data output port. The data input ports C1_IN, C2_IN, C3_IN are preferably twelve bits wide, thereby permitting unsigned input data in the range of 0-4095. The data output ports C1_OUT, C2_OUT, C3_OUT are also preferably twelve bits wide, but the data value is dependent on the type of function being performed. The coefficient input port COEFF_IN is preferably thirteen bits wide to permit entry of 10-bit 2's complement multiplication coefficients and 13-bit 2's complement offset coefficients. In addition, both of the data input ports C1_IN, C2_IN, C3_IN and the coefficient input port COEFF_IN are preferably bidirectional.

The data input ports C1_IN, C2_IN, C3_IN are coupled input data router unit 12, which routes the input to the appropriate multipliers X1–X9 based on a mode selection control signal supplied to the mode selection port MODE SELECT. The input data router unit 12 also routes data entered in the coefficient input port COEFF_IN to the data input ports C1_IN, C2_IN, C3_IN in a color conversion application of the integrated circuit device 10. The mode selection signal also controls the operation of coefficient routing units 14–18 and an output data router unit 20 coupled to the data output ports C1_OUT, C2_OUT, C3_OUT. Three adders A1-A3 couple the outputs of the multipliers X1-X9 to the inputs of the output data router unit 18. An address generator 22, the function of which will be described at a later point, is also coupled to the output data router unit 20.

Further details of the functional setup of the integrated circuit chip in response to the mode selection signal will be described with reference to FIGS. 2–6, which illustrate detailed block diagrams showing the specifics of the structure of the input data router unit 12, the coefficient routing units 14–18, and the output routing unit 20 for each of the desired signal processing operations. It should be noted that FIGS. 3–6 shows only those connections necessary to perform the operation corresponding thereto and, for the sake of clarity, does not illustrate the switching elements required to switch from one illustrated configuration to another. The provision of such switching elements is illustrated in FIG. 2, and the control thereof in response to the mode selection signal will be readily understood by one of ordinary skill in the art.

A. Sequential Matrix Operation Mode

Figure 2:
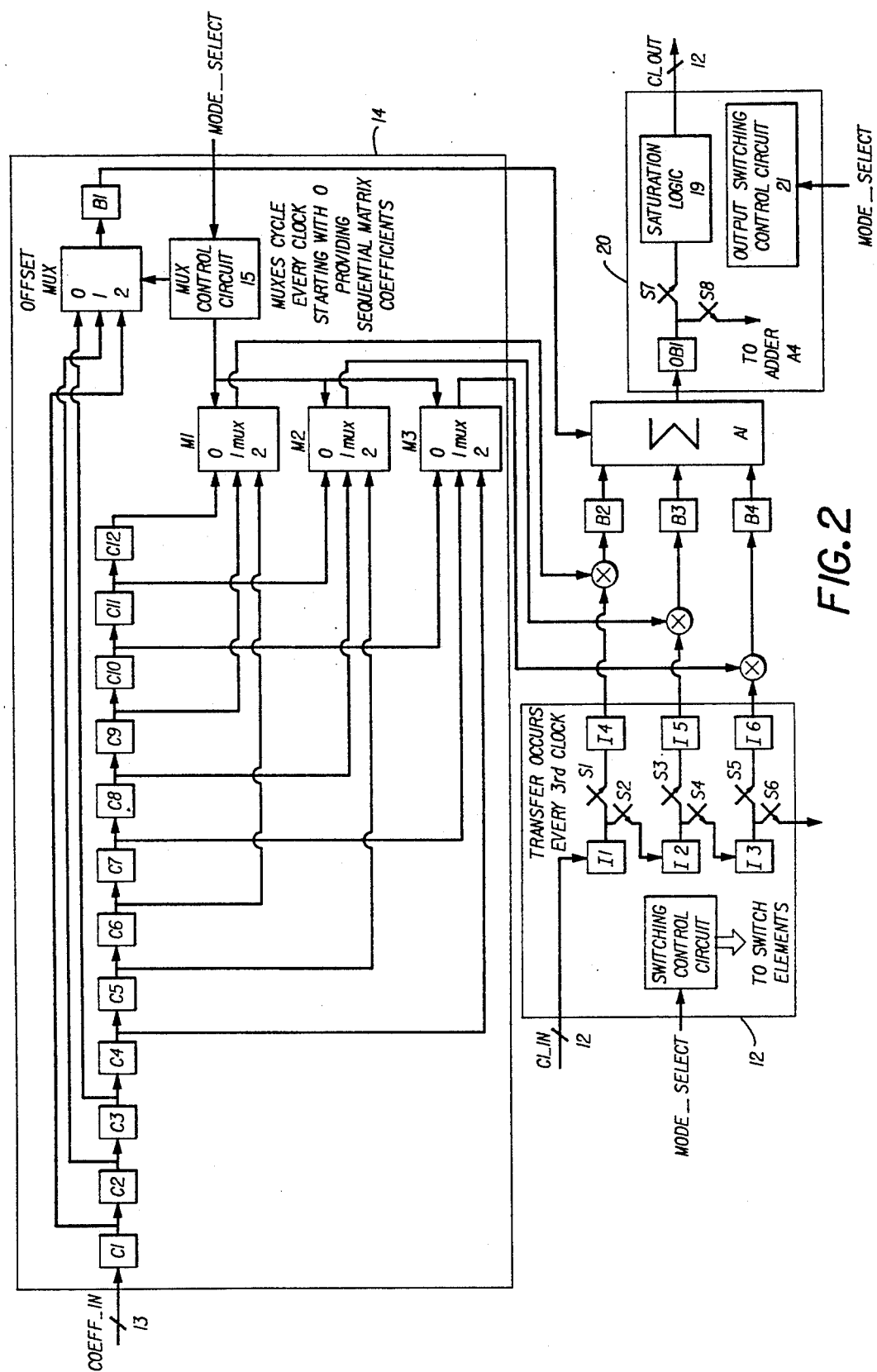
FIG. 2 is a detailed block diagram of one of three channels of the integrated circuit device illustrated in FIG. 1 when configured to perform a serial matrix operation.

The device configuration for performing a sequential matrix operation in response to the mode selection signal for a single channel is illustrated in FIG. 2. Sequential red, green and blue input data (R, G, B) is supplied to the data input port C1_IN (e.g. R1, G1, B1, then R2, G2, B2, then R3, G3, B3, etc . . . ) and matrixed red, green and blue output data (R0, G0, B0) is generated sequentially at the data output port C1_OUT ($R_o1$, $G_o1$, $B_o1$, then $R_o2$, $G_o2$, $B_o2$, then $R_o3$, $G_o3$, $B_o3$, etc . . . ) with a six pixel pipeline delay. Although only a single channel is illustrated, it will be understood that the device architecture permits simultaneous operations of three separate channels in the sequential matrix operation mode, due to the provision of the three data input ports C1_IN, C2_IN, C3_IN and the three data output ports C1_OUT, C2_OUT, C3_OUT and the of nine core group multipliers, i.e., the same architecture is duplicated with respect to all data input ports, their corresponding data output ports, and the three rows of multipliers.

The appropriate coefficients for performing the desired sequential matrix operation are loaded into the coefficient routing unit 14 prior to the application of the input data to the input port C1_IN. The coefficients are grouped into independent sets called rows. Each row consists of twelve coefficient values, namely, nine 10-bit multiplication coefficients and three 13-bit offset coefficients. The coefficient values for a row are loaded into the coefficient shift registers C1-C12 coefficient routing unit 14 sequentially like a twelve stage shift register. In the sequential matrix operating mode, each row of coefficients represents the complete 3×4 matrix. It is assumed that the input data is R, G, B, sequential as defined in Eq. (1) for each channel utilized. Thus, the order for loading the coefficients into the coefficient routing unit 14 is $a_{13}$, $a_{12}$, $a_{11}$, $a_{23}$, $a_{22}$, $a_{21}$, $a_{33}$, $a_{32}$, $a_{14}$, $a_{24}$, $a_{34}$.

During operation, the sequential input data supplied to the data input port C1_IN is converted to a parallel format by the use of input registers I1-I6 provided within the input data router unit 12. The output of registers I1-I3 are selectively connectable, via the switches S1-S6 under control of the input switching control circuit 13, so that output data from the registers I1-I3 is either shifted within the registers themselves (I1 to I2 to I3) or supplied in parallel to corresponding input registers I4-I6. For example, R1 is loaded first in register I1; R1 is then shifted to register I2 and G1 is loaded into register I1; and R1 is then shifted to register I3, G1 is shifted to register I2 and B1 is loaded into register I1. The next operation is then a parallel transfer of R1, G1, B1 respectively into input registers I6, I5, I4 by opening switches S2, S4, and S6 and closing switches S1, S3 and S5. Input registers I1, I2, I3 are then reloaded with the next group of pixel data (R2, G2, B2) in a similar manner, while R1, G1, B1 are operated on from input registers I6, I5, I4 by multipliers X1-X3.

Multiplier coefficients and offset coefficients are respectively supplied to the multipliers and adder A1 via multiplier MUX units M1-M3 and an offset Mux unit. The outputs of the first three coefficient registers C1-C3 are coupled to the input of the offset MUX unit, and the outputs of coefficient registers C6, C9, C12 are coupled to the input of multiplier MUX unit M1, the outputs of the coefficient registers C5, C8, C11 are coupled to the input of multiplier MUX unit M2, and the outputs of the coefficient registers C4, C7, C10 are coupled to the input of multiplier MUX unit M3. The outputs of the multiplier MUX units M1-M3 are respectively connected to multipliers X1-X3 and the output from the offset MUX unit, after passing through a buffer register B1, is supplied to the adder A1. The multiplier MUX units M1-M3 and the offset MUX unit are switched or cycled every clock cycle by the MUX control circuit 15. Thus, multiplier coefficients stored in registers C6, C9, C12 (namely $a_{13}$, $a_{23}$, $a_{33}$ for the illustrated example) are sequentially supplied to the multiplier X1, multiplier coefficients stored in registers C5, C8, C11 (namely $a_{12}$, $a_{22}$, $a_{32}$) are sequentially supplied to the multiplier X2, multiplier coefficients stored in registers C4, C7, C10 (namely $a_{11}$, $a_{21}$, $a_{31}$) are sequentially supplied to the multiplier X3, and multiplier coefficients stored in registers C3, C2, C1 (namely $a_{14}$, $a_{24}$, $a_{34}$) are subsequently sequentially supplied to the adder A1 via the buffer register B1.

The outputs from the multipliers X1-X3 are supplied to the adder A1 via corresponding buffer registers B2-B4. The output of the adder A1 is then supplied to an output buffer register OB1 located in the output router unit 20. In the sequential matrix operations mode, an output switching control circuit 21 of the output router unit 20 closes switch S7 in order to connect the output from the output buffer register OBI a corresponding data output port C1_OUT via saturation logic 19. The saturation logic 19 is preferably employed to clip or limit the value supplied from the output buffer register OBI to a twelve bit value, in order to match the value supplied to the corresponding output port C1_OUT to the number of pins or bits assigned to the output port.

The illustrated architecture permits three sequential 1×4 matrix operations to be performed as the sequential input color data is transformed into a parallel format and held for three clock cycles, while the coefficients necessary to perform the matrix operation are sequentially switched. The provision of three separate and independent channels within the integrated circuit device permits either one, two or three channels of sequential 1×4 matrix operations to be performed simultaneously.

B. Parallel Matrix Operation Mode

Figure 3:
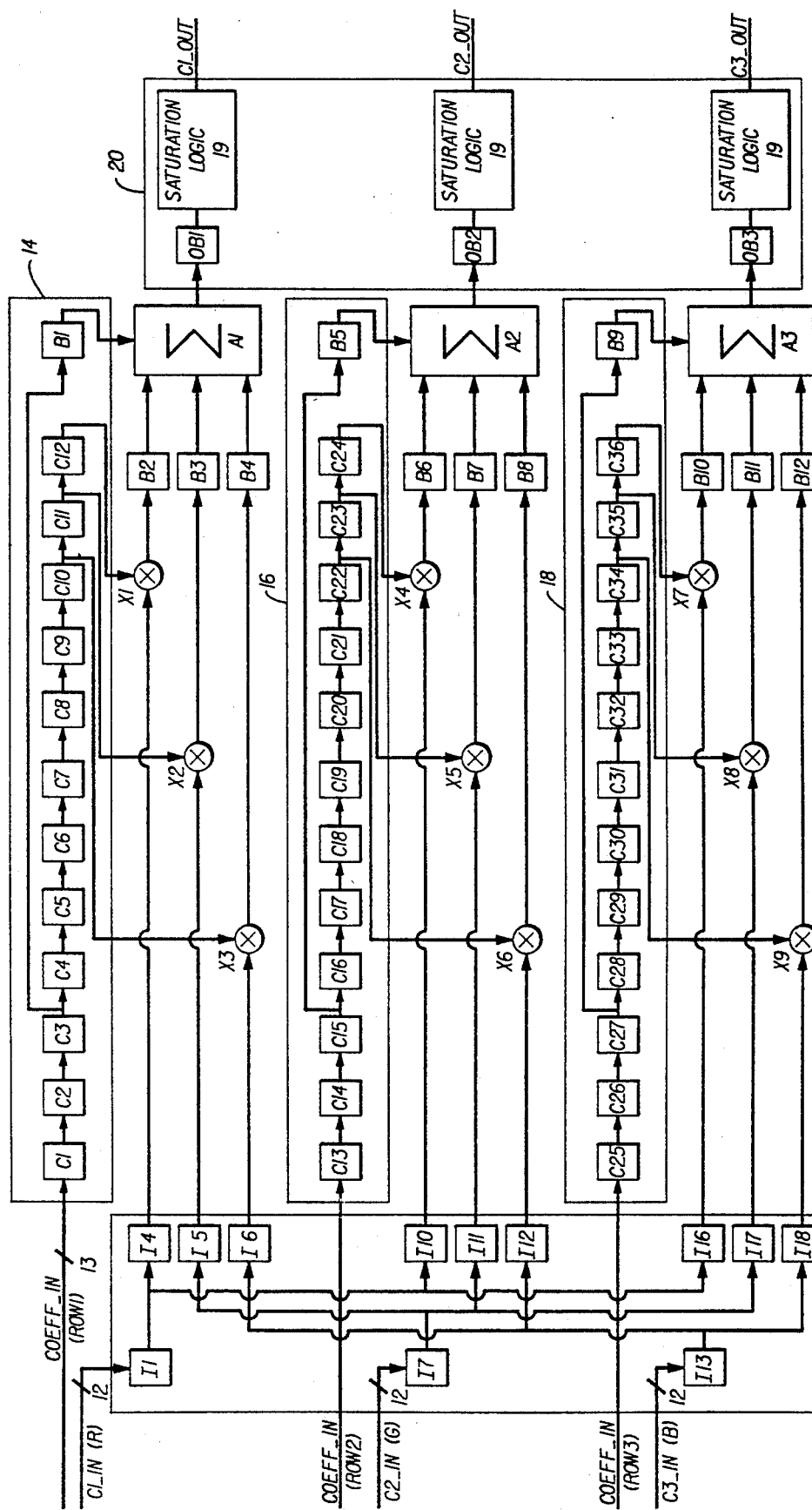
FIG. 3 is a detailed block diagram of the integrated circuit device illustrated in FIG. 1 when configured to perform a parallel matrix operation.

A 3×4 matrix operation can be performed by simultaneously using all three data input ports and all three data output ports if the red, green and blue image data is supplied in parallel instead of serially. The routing architecture for the integrated circuit device in a parallel matrix operation mode is illustrated in FIG. 3. It should be noted that certain elements, for example, the switching elements in the input data router 12 and output data router 20 required to configure the device for this mode of operation have not be illustrated for the sake of clarity Similarly, the multiplier MUX units and offset MUX units in each of the coefficient routing units 14-18 and the input registers that are not utilized have been omitted for the sake of clarity.

In the parallel matrix operation mode, the red, green and blue image data is respectively supplied simultaneously to the three data input ports C1_13IN, C2_IN, C3_IN in parallel. The 3×4 matrixed red, green and blue output values $R_0$, $G_0$, $B_0$ are then simultaneously available in parallel at the three output ports C1_OUT, C2_OUT, C3_OUT with a four pixel pipeline delay.

Only four of the twelve values in each coefficient set to be loaded in the coefficient routing units 14-18 are required. Complete coefficients sets must be loaded, however, in each of the coefficient routing units 14-18 using twelve clock cycles due to the shift register architecture employed therein. Eight of the twelve values loaded are therefore designated as logical don't cares (X). For example, assuming the input data is R at data input port C1_in, G at data input port C2_IN, and G at data input port C3_IN, then the order of loading the coefficients in accordance with Eq. (2) would be:
Row 1: $a_{11}$, $a_{12}$, $a_{13}$, X, X, X, X, X, X, $a_{14}$, X, X
Row 2: $a_{21}$, $a_{22}$, $a_{23}$, X, X, X, X, X, X, $a_{24}$, X, X
Row 3: $a_{31}$, $a_{32}$, $a_{33}$, X, X, X, X, X, X, $a_{34}$, X, X The coefficients are fixed for each cycle of operation. Thus, the multiplier MUX units and the offset MUX units in the coefficient routing units 14-18 are not sequenced by the MUX control circuit, but instead, are fixed to select the zero (0) input as illustrated in FIG. 2. Thus, the coefficient routing units 14-18 couple the last three registers in each routing unit C10-12, C22-24, C34-36 to corresponding multipliers X3-X1, X6-X4, X9-X7, and the first register in each routing unit C1, C13, C25 to the buffer registers B1, B5, B9 as shown in FIG. 3 in response to the mode selection control signal.

Each row of multipliers also require data from all of the data input ports C1-IN, C2_IN, C3_IN. Thus, the outputs of each of the input registers, I1, I7, I13 respectively connected to the data input ports C1-IN, C2_IN, C3_IN are routed so that the input data supplied to each data input port can be supplied to each row of multipliers. For example, as illustrated in FIG. 3, the output of input register I1 is coupled to input registers I4, I10 and I16; the output of input register I7 is coupled to input registers I5, I11 and I17; and the output of input register I13 is coupled to input registers I6, I12 and I18.

As in the case of serial matrix operation, the outputs from the multipliers X1-X3, X4-X6, X7-X9 are supplied to corresponding adders A1, A2, A3 via buffer registers B1-B3, B6-B8, B10-B12, and the output of each adder A1, A2, A3 is coupled to a corresponding output register OB1, OB2, OB3. The output from the output registers are then supplied to the three corresponding data output ports C1-OUT, C2_OUT, C3_OUT after passing through the saturation logic 19.

C. 2-D Convolution Operation Mode

Figure 4:
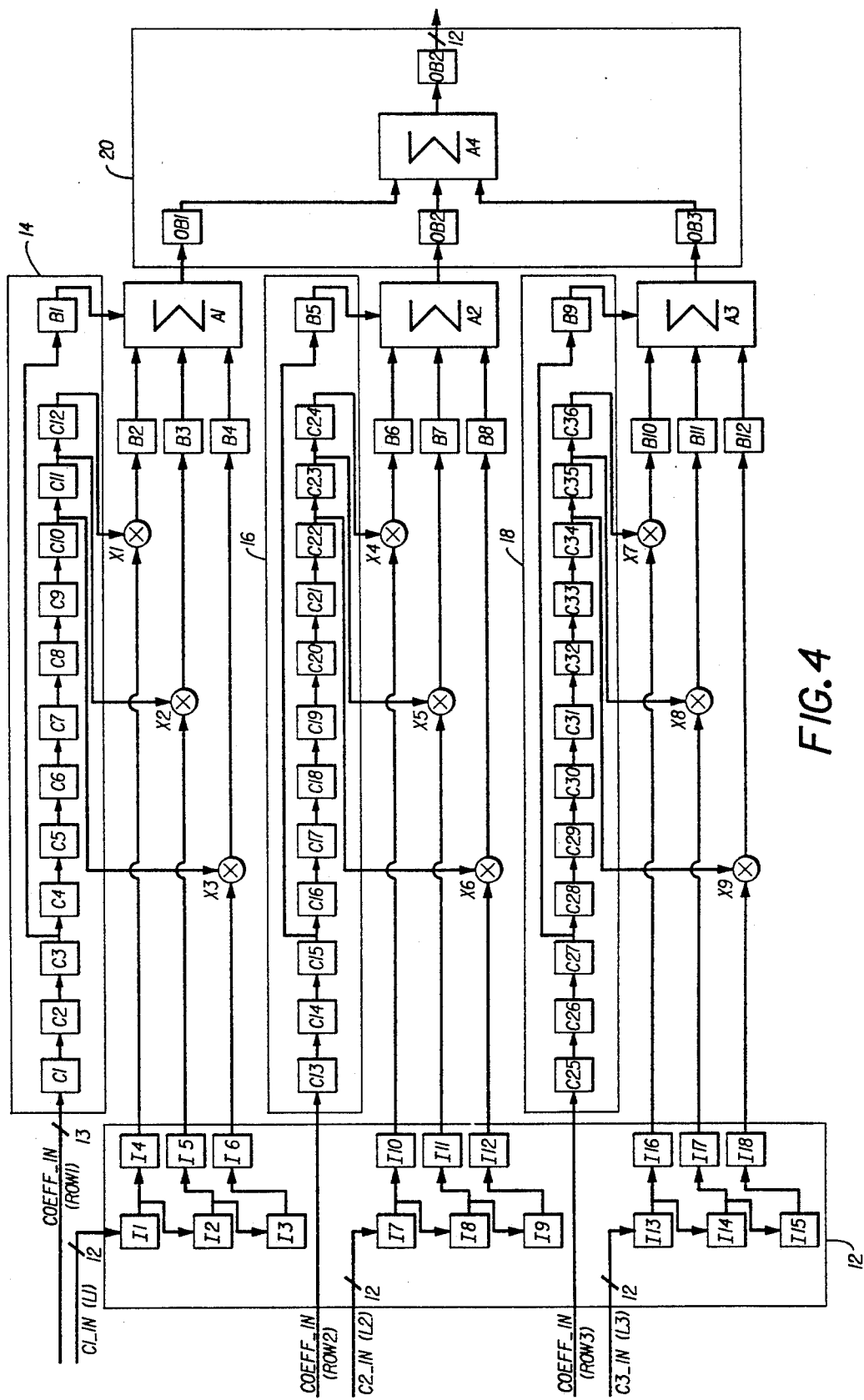
FIG. 4 is a detailed block diagram of the integrated circuit device illustrated in FIG. 1 when configured to perform a 2-D convolution operation.

The architecture for a 2-D 3×3 convolution mode of operation with the possible addition of three offsets suitable for 2-D filtering, edge detection, etc. is shown in FIG. 4. The convolution configuration employs the same setup for the input registers in the input data router unit 12 as is used in the serial matrix operation mode and the same setup for the coefficient routing units 14-18 as is sued in the parallel matrix operation mode. A different output configuration is required, however, as will be described in greater detail below.

In this mode, three lines of an image data (usually a single color plane) are simultaneously input at the three data input ports C1_IN, C2_IN, C3_IN a pixel (of each line) at a time. For example, assuming the input data is Line 1 (L1) at port C1_IN, Line 2 (L2) at port C2_IN and Line 3 (L3) at port C3_IN, then three lines of input image entered into the integrated circuit device would be:

L1,1; L1,2; L1,3; L1,4 . . . at port C1_IN
L2,1; L2,2; L2,3; L2,4 . . . at port C2_IN
L3,1; L3,2; L3,3; L3,4 . . . at port C3_IN where LI,J is Line-I Pixel-J. After the third pixel from each line has been entered, the 3×3 convolved value with the possible addition of three offsets is available with a five pixel pipeline delay.

In this case, the input registers are selectively controlled so that the data in the second column of registers mirrors the data present in the first column of registers. For example, L1,1 is loaded into I1 and is then supplied to I4; L1,1 is then shifted into I2 and then supplied to I5 while L1,2 is loaded into I1 and then supplied to I4. The second column of registers is not required for this mode of operation, but the registers are present for use in the other modes of operation and the data must therefore be passed from the first column of registers to the second column of registers before it can be supplied to the multipliers.

As with the case of the parallel matrix operation mode, only four of the eight values required to be loaded in the coefficient routing units 14-18 are required. The remaining eight values are entered as logical "don't cares" (X).

If the kernel is:

$$a_{11}\ a_{12}\ a_{13}+a_{14}$$

$$a_{21}\ a_{22}\ a_{23}+a_{24}$$

$$a_{31}\ a_{32}\ a_{33}+a_{34}$$

where $a_{14}$, $a_{24}$, $a_{34}$ are offsets that are added after multiplication (dot product) by the other coefficients of a particular row, then the order of loading the coefficients is:

Row 1 $a_{13}$, $a_{12}$, $a_{11}$, X, X, X, X, X, X, $a_{14}$, X, X
Row 2 $a_{23}$, $a_{22}$, $a_{21}$, X, X, X, X, X, X, $a_{24}$, X, X
Row 2 $a_{33}$, $a_{32}$, $a_{31}$, X, X, X, X, X, X, $a_{34}$, X, X

The outputs of the three output registers OB1-OB3 are supplied to an adder A4 located within the output data router unit 20 in the convolution mode of operation instead of directly to the output ports. The saturation logic 19 is not utilized in this mode of operation. The output value resulting from the operation of the adder A4, however, is a 22-bit 2's complement number which exceeds the twelve bit width assigned to each of the output ports. Thus, the output value must be made available at 22 of the 36 output port pins provided for the three output ports C1_OUT, C2_OUT, C3_OUT, i.e., the output value in the convolution mode is supplied across the pins assigned to two of the three output ports.

D. 1-D FIR Filter Operation Mode

Figure 5:
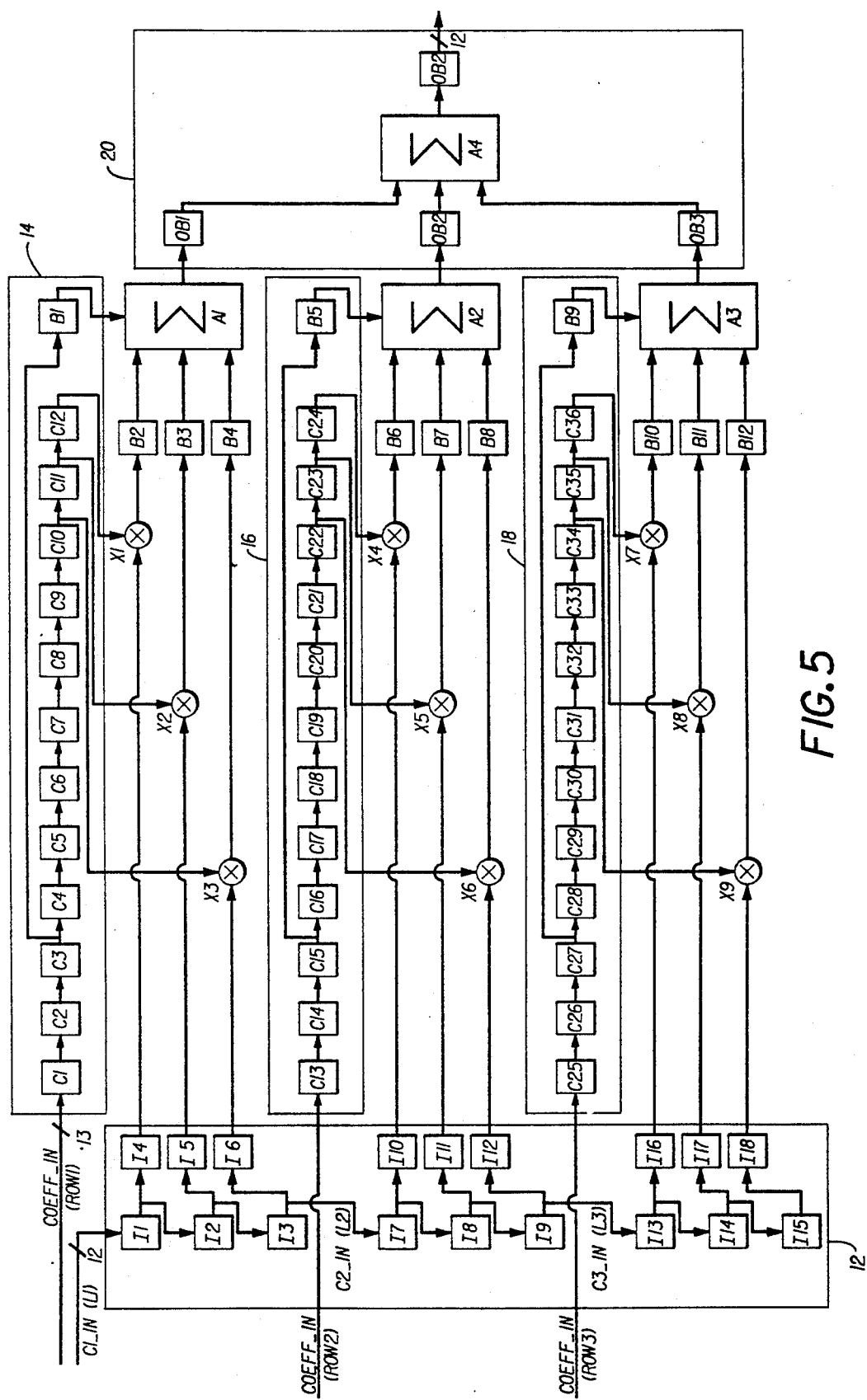
FIG. 5 is a detailed block diagram of the integrated circuit device illustrated in FIG. 1 when configured to perform a FIR filter operation.

The architecture for a 1-D FIR Filter operation mode is very similar to the convolution mode of operations as illustrated in FIG. 5. The FIR filter operation mode, however, only requires the use of one input port C1_IN. The input registers I1-I3, I7-I9 and I13-I15 are configured by the input data router unit 12 to act as one large shift register. Assuming the input data at C1_IN is:

$$X1, X2, X3, X4 \ldots \text{at port } C1\_IN$$

If the kernel is $$a_1\ a_2\ a_3\ a_4 \ldots a_9+a_{10}+a_{11}+a_{12}$$

where $a_{10}$, $a_{11}$, $a_{12}$ are offsets that are added after multiplication (dot product) by the other coefficients, then the order of loading the coefficients for a nine-tap filter is:

Row 1 $a_9$, $a_8$, $a_7$, X, X, X, X, X, X, $a_{10}$, X, X
Row 2 $a_6$, $a_5$, $a_4$, X, X, X, X, X, X, $a_{11}$, X, X
Row 2 $a_3$, $a_2$, $a_1$, X, X, X, X, X, X, $a_{12}$, X, X

If less than a nine-tap filter is desired, Row 3 is loaded, then Row 2 and then Row 1, working with the subscripts as above, and the missing higher order subscripts are filled with O's.

After the ninth value is input, the filtered value is available with a five clock cycle pipeline delay. This value is the summation of the three rows and, as in the case of the convolution operation, is a 22-bit 2's complement number that is output using 22 of the available 36 pins assigned to the three output ports C1_OUT, C2_OUT, C3_OUT.

F. Systems Application

In tri-linear color scanning applications, three different sequential 1×4 matrix operations are needed, with appropriate curve shaping between matrix operations, for image quality reasons. The input data for each matrix operation is sequential triplets (e.g. R, G, B) of scanned data. In order to accommodate all three matrix operations with a single chip with no external components, besides the curve shaping tables, each channel of the integrated circuit device 10 is preferably designed to have a pipe-line delay in the sequential matrix operation mode that is a multiple of three, thereby eliminating the need for re-synchronization of the data for any particular channel within the integrated circuit device.

Figure 6:
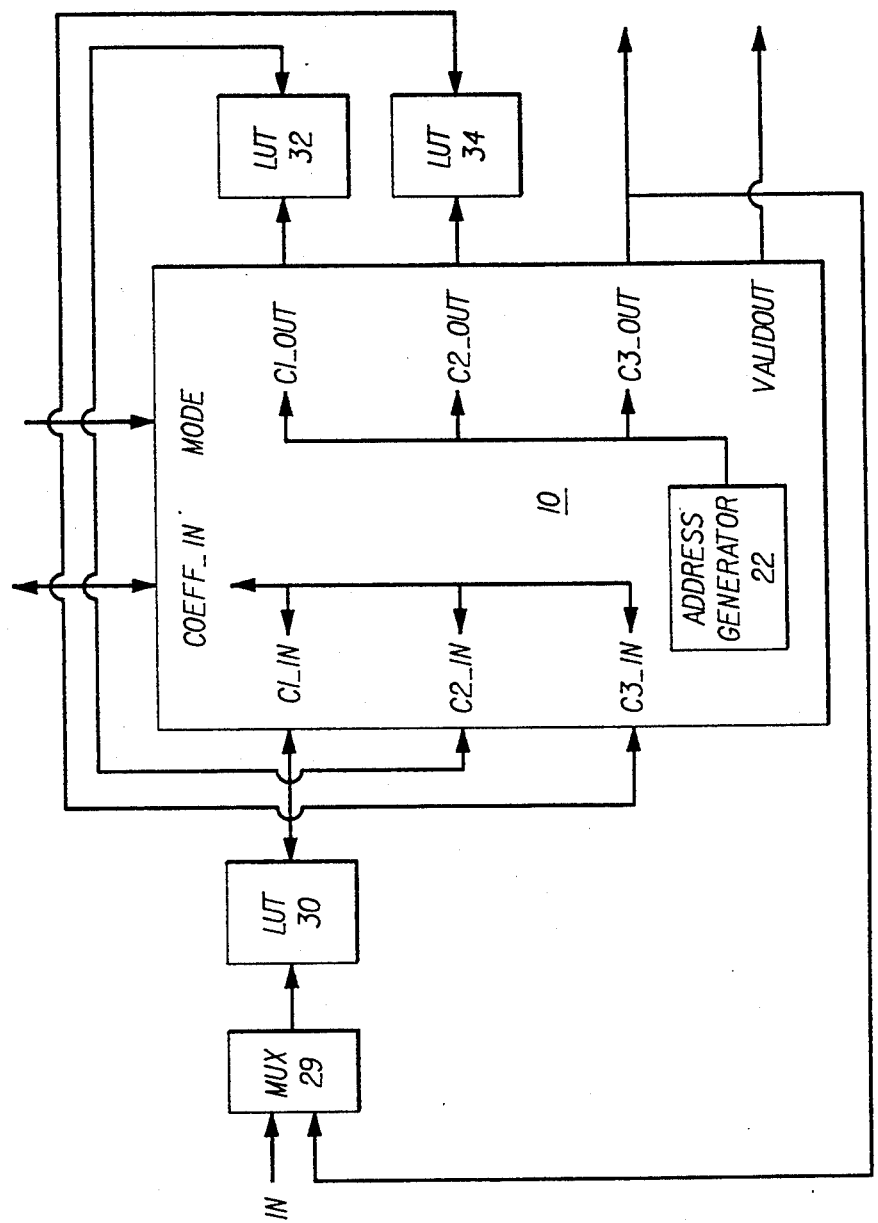
FIG. 6 illustrates the use of the integrated circuit device of FIG. 1 in a three channel sequential matrix application.

The system level architecture for a three-channel sequential color conversion matrix system that utilizes curve shaping LUTs between matrix operations is shown in FIG. 6. The LUTs 30–34 are preferably random access memory devices (RAM). As the LUTs 30–34 are connected to the matrix datapath in normal operation via the data input port C1_IN and data output ports C1_OUT and C2_OUT, the integrated circuit device 10 employs the address counter illustrated in FIG. 1 to supply addresses at the output ports C1_OUT, C2_OUT, C3_OUT in order to load the LUTs 30–34. An input multiplexer 29 is employed to select either the data output port C3_OUT as the input to the LUT 30 during initialization or the data input line IN as the input to the LUT 30 during normal operation. The data to be loaded in the LUTs 30–24 is input through the coefficient port COEFF_IN as shown in FIG. 6, and then output through the input ports C1_IN, C2_IN, C3_IN for the purposes of initializing the LUTs. The address information is output from all three output ports C1_OUT, C2_OUT, C3_OUT simultaneously just as the data is output at all three bi-directional input ports C1_IN, C2_IN, C3_IN. Hence, an externally controlled chip select is necessary for the LUTs 30–34 so that the appropriate LUT gets the appropriate data if there is more than one LUT connected in the system as illustrated above. The LUTS 30–34 can also be read in a verification mode by again using the address counter to generate addresses, reading the LUT data through the data input ports C1_IN, C2_IN, C3_IN, and outputting the data for verification through the coefficient port COEFF_IN, which—like the input ports—is bi-directional in nature for the verification of the LUTs 30–34. Finally, a gating signal VALIDOUT, indicating when the output data is valid and which takes into account the pipeline delay specifically for the three-channel system operation, is preferably provided by circuitry internal to the integrated circuit device 10 in order to permit subsequent circuitry coupled to the output to handle the output data.

The invention has been described with reference to certain preferred modes of carrying out the invention. It will be understood, however, that modifications and variations to the illustrated embodiments are possible within the scope of the appended claims.

Industrial Utility

The invention provides an integrated circuit device that performs four commonly used digital signal processing functions. The device is useful for color optimization in scanning applications using linear CCD sensors, in electronic imaging applications using area sensors, as well as a variety of image processing applications like edge detection, enhancement, filtering and precompression processing.

What is claimed is:

1. A selectively configurable integrated circuit device comprising:
   at least three data input ports, a coefficient input port, a mode selection input port, and three data output ports;
   an input data router unit coupled to the data input ports and the mode selection input port;
   at least three rows of multipliers, each row having a plurality of multipliers;
   at least three adder units corresponding to each row of multipliers, wherein inputs of each adder unit are coupled to the outputs of the multipliers within the multiplier row corresponding to each adder unit;
   an output data router unit coupled to the outputs of the adder units, the three data output ports, and the mode selection input port; and
   at least three coefficient routing units corresponding to the three rows of multipliers, wherein outputs of each coefficient routing unit are coupled to each multiplier within the corresponding multiplier row and to the adder unit coupled to the corresponding multiplier row;
   wherein the input data router transfers sequential data received from at least one of the data input ports into parallel data in response to a first operational mode control signal received from the mode selection port and supplies the parallel data to at least one row of multipliers, and
   wherein the input data router supplies data received from each data input port to all of the mulitplier rows in response to a second operational mode control signal received from the mode selection port.

2. A selectively configurable integrated circuit device as claimed in claim 1, further comprising an address generator coupled to the output data router.

3. A selectively configurable integrated circuit device as claimed in claim 2, wherein the input data router unit is also coupled to the coefficient input port.

4. A selectively configurable integrated circuit device as claimed in claim 3, wherein the coefficient input port and the data input ports are bi-directional.

5. A selectively configurable integrated circuit device as claimed in claim 1, wherein the input data router transfers sequential data received from at least one of the data input ports into parallel data in response to a first operational mode control signal received from the mode selection port, and supplies the parallel data to at least one row of multipliers.

6. A selectively configurable integrated circuit device as claimed in claim 5, wherein the coefficient routing unit coupled to row of multipliers that receives the parallel data sequentially supplies multiplier coefficients to each multiplier within the row of multipliers and offset coefficients to the adder unit coupled to the row of multipliers in accordance with a predetermined pattern in response to the first operational mode signal received from the mode selection port.

7. A selectively configurable integrated circuit device as claimed in claim 6, wherein the output data router unit supplies the output from the adder coupled to the row of multipliers that receive the parallel data to a corresponding one of the data output ports in response to the first operational mode signal received from the mode selection port.

8. A selectively configurable integrated circuit device as claimed in claim 1, wherein the input data router supplies data received from each data input port to all of the multiplier rows in response to a second operational mode control signal received from the mode selection port.

9. A selectively configurable integrated circuit device as claimed in claim 8, wherein each coefficient routing unit repeatedly supplies fixed multiplier coefficients to each multiplier within the corresponding row of multipliers and fixed offset coefficients to the adder unit coupled to the corresponding row of multipliers in response to the second operational mode signal received from the mode selection port.

10. A selectively configurable integrated circuit device as claimed in claim 9, wherein the output data router unit supplies the outputs from each of the adder units to a corresponding one of the data output ports in response to the second operational mode signal received from the mode selection port.

11. A selectively configurable integrated circuit device as claimed in claim 9, wherein the output data router unit supplies the outputs from each of the adder units to an output adder unit in response to the third operational mode signal received from the mode selection port.

12. A selectively configurable integrated circuit device as claimed in claim 1, wherein the input data router transfers sequential data received from each of the data input ports into parallel data in response to a third operational mode control signal received from the mode selection port, and supplies the parallel data from each data input port to a corresponding row of multipliers.

13. A selectively configurable integrated circuit device as claimed in claim 12, wherein each coefficient routing unit repeatedly supplies fixed multiplier coefficients to each multiplier within the corresponding row of multipliers and fixed offset coefficients to the adder unit coupled to the corresponding row of multipliers in response to the third operational mode signal received from the mode selection port.

14. A selectively configurable integrated circuit device as claimed in claim 1, wherein the input data router transfers sequential data received from one data input port into parallel data in response to a fourth operational mode control signal received from the mode selection port, and supplies the parallel data from the to the rows of multipliers.

15. A selectively configurable integrated circuit device as claimed in claim 14, wherein each coefficient routing unit repeatedly supplies fixed multiplier coefficients to each multiplier within the corresponding row of multipliers and fixed offset coefficients to the adder unit coupled to the corresponding row of multipliers in response to the forth operational mode signal received from the mode selection port.

16. A selectively configurable integrated circuit device as claimed in claim 15, wherein the output data router unit supplies the outputs from each of the adder units to an output adder unit in response to the fourth operational mode signal received from the mode selection port.

17. A color space conversion system for processing image data, said system comprising:
a selectively configurable integrated circuit device including first, second and third data input ports, a coefficient input port, a mode selection input port, and first, second and third data output ports, an input data router unit coupled to the first, second and third input ports and the mode selection input port, at least three rows of multipliers, each row having a plurality of multipliers, at least three adder units corresponding to each row of multipliers, wherein inputs of each adder unit are coupled to the outputs of the multipliers within the multiplier row corresponding to each adder unit, an output data router unit coupled to the outputs of the adder units, the first, second and third data output ports, and the mode selection input port, at least three coefficient routing units corresponding to the three rows of multipliers, wherein outputs of each coefficient routing unit are coupled to each multiplier within the corresponding multiplier row and to the adder unit coupled to the corresponding multiplier row;
an input multiplexer having a first input coupled to an input data line and a second input coupled to the third data output port;
a first look-up-table having an input coupled to an output of the input multiplexer and an output coupled to the first data input port;
a second look-up-table having an input coupled to the first data output port and an output coupled to the second data input port; and
a third look-up-table having an input coupled to the second data output port and an output coupled to the third data input port.

* * * * *